H. J. PERKINS.
REVERSE GEAR MECHANISM.
APPLICATION FILED MAR. 27, 1915.
1,166,480.
Patented Jan. 4, 1916.
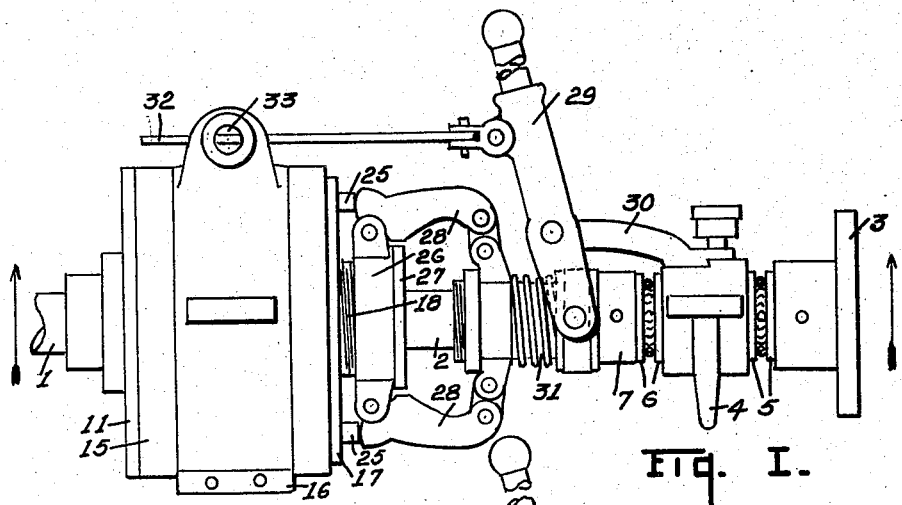
Fig. I.
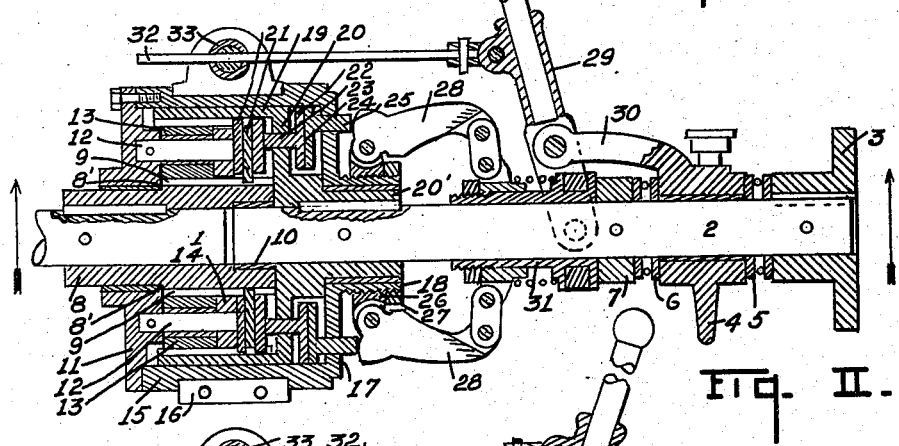
Fig. II.
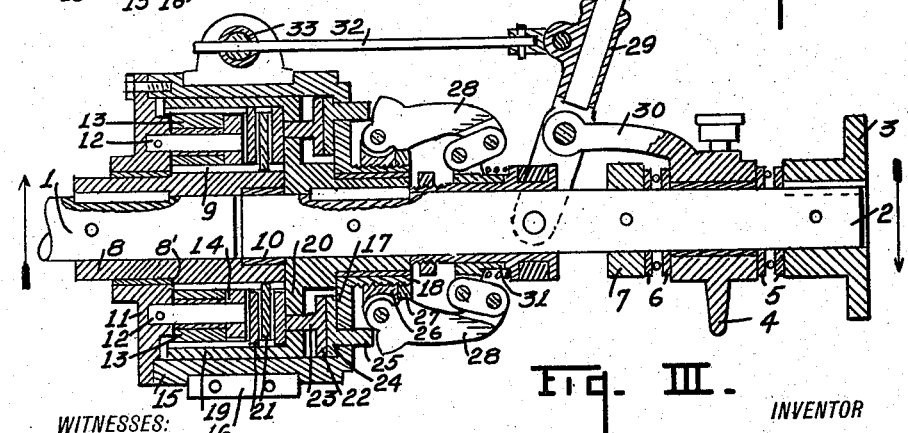
Fig. III.
WITNESSES:
INVENTOR
Harry J. Perkins
BY
ATTORNEYS

UNITED STATES PATENT OFFICE.

HARRY J. PERKINS, OF GRAND RAPIDS, MICHIGAN.

REVERSE-GEAR MECHANISM.

1,166,480.

Specification of Letters Patent.

Patented Jan. 4, 1916.

Application filed March 27, 1915. Serial No. 17,305.

*To all whom it may concern:*

Be it known that I, HARRY J. PERKINS, a citizen of the United States, residing at Grand Rapids, Michigan, have invented certain new and useful Improvements in Reverse-Gear Mechanism, of which the following is a specification.

This invention relates to improvements in reverse gear mechanism.

The main objects of this invention are: First, to provide an improved mechanism for actuating the clutch means without axial movement of the gear case or gear and other associated parts. Second, to provide an improved arrangement of clutch mechanism in a reverse gear, which shall be very simple the economical to produce.

Further objects, and objects relating to details and economies of construction and operation will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation view of my improved reverse gear mechanism, the driven shaft being broken away and details of support and the like being omitted. Fig. II is a longitudinal vertical sectional view through the mechanism, certain parts being shown in full lines, the same being shifted for direct drive. Fig. III is a longitudinal sectional view similar to that of Fig. II, the same being shifted for the reverse drive.

In the drawings, similar reference characters refer to similar parts throughout the several views, and the sectional views are taken looking in the direction of the little arrows at the ends of the section lines.

Considering the numbered parts of the drawing, 1 is the driving shaft, which may be the crank shaft of an engine, or any suitable power shaft.

2 is the driven shaft which is provided with a coupling flange 3.

4 is the bearing block in which the driven shaft 2 is supported, provided with thrust bearings 5, 6 at each side, which are engaged by the flange 3 and collar 7 respectively, which collar and flange are pinned to the said driven shaft.

8 is the sleeve pinned or otherwise secured to the power shaft 1, shouldered and journaled at 8' in the casing, and provided with elongated spur gear teeth 9. The outer end of the sleeve 8 is provided with a bearing bushing 10 to receive the inner end of the driven shaft 2 and maintain the same in alinement.

11 is the gear cage carrying journal pins 12 on which are mounted or journaled the planetary pinion 13.

14 is a supporting ring at the inner ends of the pins 12 secured to the bridge of the gear cage 11. 15 is the casing to which is secured the gear cage 11, which cage constitutes the cover for one end thereof. The casing 15 is supported in the reverse brake band 16. The casing 15 is extended into an end 17 integral therewith which is suitably perforated for actuating pins for the clutch hereafter to be described. The casing 15 is extended into a hub 18 screw threaded on the extension and journaled on the hub of the internal gear hereafter to be described.

An internal gear 19 is provided which is disposed to mesh with the planetary pinion 13 and extends beyond the same, to form a chamber to receive the clutch. The crown 20 of the gear is perforated for the passage of the axially disposed clutch actuating pins, hereafter to be described. The crown 20 is extended into a shouldered hub 20', the shoulder of which engages the head 17 of the casing. The hub 20' is journaled within the hub 18 of the casing. A friction clutch comprising disks 21 which alternately are notched to engage the gear 9 or the internal gear 19, are disposed within the chamber in the crown 20 of the said internal gear 19, and coact with the ring 14 at the inner end of the gear cage. A chamber is formed between the interior of the end of the casing 15 and the outer end of the crown 20 of the internal gear 19. A disk 22 with axially disposed pins 23 is disposed within this space, the pins 23 extending through perforations in the crown of the gear and contacting with the clutch rings 21 for the purpose of compressing the same. A corresponding disk 24 faced to revolve in proximity to disk 22 is arranged within the chamber and is provided with outwardly and axially disposed thrust pins 25 and coöperates with the disk 22. The pins 25 extend outwardly beyond the cage in position to be acted upon by the toggle levers through which the clutch is operated.

On the hub 18 is a threaded collar 26 which is retained in position by the lock nut 27, and on this collar the toggle levers 28 are disposed and fulcrumed to act upon the pins 25 of the disk 24. They thus communicate pressure to the clutch disk 21 within the internal gear. A control lever 29 is fulcrumed on the bracket 30 and acts upon a suitable toggle sleeve 31 for actuating the toggle levers. A connection 32 is from the control lever 29 to actuate the cam means 33 for controlling the reverse brake band 16. These parts do not need detailed description because they appear in detail and are described in my patent application, Ser. No. 14,363, filed March 15, 1915, as do certain other details which I have not described minutely at this point for that reason.

The toggle means for manipulating the clutch can be of any well known construction. The connections for operating the brake band may also be of any desired or well known construction, and therefore I have not described the same in detail at this point. I have only indicated these parts sufficiently for the purpose of actuation. I also desire to state that the proportions of the gears and pinions can be greatly varied herein and corresponding change in the other parts to accommodate them. Modifications and details, it will be seen, can be readily made without departing from the spirit of my invention.

The advantages of operation of my improved structure will thus readily appear. There is no axial movement of any of the gears or of the casing. When the control lever is thrown to the position indicated in Fig. II, it throws the toggle levers 28 to the position there indicated, and they exert pressure upon the thrust pins 25, thereby forcing the ring 24 into contact with the ring 22 and thrusting the thrust pins 23 into contact with the disk of the disk clutch, thereby clutching the parts together so that they revolve freely within the reverse brake band, which reverse brake band will have opened by the operation of the connection 32. From this description it is clear that no parts have been acted upon by the toggle lever except the clutch means.

When the control lever is thus shifted the brake band is released and the parts clutched, without any interference with the gears. The driving shaft is connected through the spur gear and gear cage and the clutch and internal gear direct to the driven shaft.

When the control lever is shifted to the position indicated in Fig. III, the reverse brake band is tightened and the clutch, by the reverse movement of the toggle, is released and the pinions of the planetary gears act to reverse the driven shaft and drive the same at a lower rate of speed, as is usual in such reverse gears when used for marine purposes.

By this structure it is not necessary to provide finished bearing surfaces on either of the gears to coöperate with the clutch means, and because the internal gear need not be reciprocated, it can be pinned or effectively secured to the driven shaft. When so secured and fitted within the case to run freely, the internal gears serve as additional support for the shaft, which, with the central bearing support preserves perfect alinement and a very strong support for the driven shaft. This is an important feature, as it enables very compact construction and avoids the unnecessary finishing of parts.

Having thus described my invention, what I claim as new and desire to secure by Letters Patent is:

1. In a reverse gear mechanism, the combination of a driving shaft, a driven shaft, a spur gear with a shouldered journal hub and with elongated teeth, carried by said driving shaft, a gear cage journaled on the spur gear hub with comparatively short pinions meshing with said spur gear, a clutch ring carried by said gear cage at its inner end, a case or drum, one end of which is closed by said gear cage and the opposite end closed and extended into a hub provided with a journal bearing for the internal gear hub, an internal gear with teeth longer than the said pinions disposed to mesh therewith and disposed to form a chamber for the clutch at the inner end of said cage, the crown of which gear is extended into a shouldered hub fixed to the driven shaft and being perforated for the passage of thrust pins, the internal gear being of such dimensions as to form a chamber between the gear and said casing, contact rings disposed in said chamber, the inner one of which is provided with thrust pins to act upon the clutch and the outer of which is provided with axially disposed thrust pins extending through the head of the case, and toggle lever connections for acting upon the said clutch pins, coacting as specified.

2. In a reverse gear mechanism, the combination of a driving shaft, a driven shaft, a spur gear carried by one of said shafts, an internal gear carried by the other shaft, a gear cage with planetary pinions disposed to mesh between the said gears and disposed within the internal gear to form a clutch chamber at its inner end, a casing surrounding the internal gear of such dimension as to form a chamber between the crown of said gear and the said casing, clutch disks disposed within the clutch chamber, the alternate disks of which engage the internal and external gears, contact rings disposed with bearing surfaces toward each other in the chamber within the case, the inner of which is provided with thrust pins which extend through the crown of the gear to the clutch and the outer of which is provided with thrust pins which extend beyond the outer end of the case, and lever connections for acting upon the said pins to actuate the said clutch, as specified.

3. In a reverse gear mechanism, the combination of a driving shaft, a driven shaft, a spur gear on the driving shaft with an extension containing a bearing for the end of the driven shaft, an internal gear, the crown of which is extended in a hub and fixed to the driven shaft, disposed to surround the spur gear of the driving shaft, a planetary gear cage with pinions disposed between the said internal and spur gears, a reverse brake band for the planetary gear, and a clutch for direct connection between the said driving and driven shafts, as specified.

4. In a reverse gear mechanism, the combination of a driving shaft, a driven shaft, a spur gear on the driving shaft having a shouldered hub, with an extension containing a bearing for the end of the driven shaft, an internal gear, the crown of which is extended in a shouldered hub and fixed to the driven shaft, disposed to surround the spur gear of the driving shaft, a planetary gear cage with pinions disposed between the said internal and spur gears, a casing with journal bearings at each end engaging the shouldered hub of said gears to retain them in fixed longitudinal relation, a reverse brake band for the planetary gear, and a clutch for direct connection between the said driving and driven shafts, as specified.

5. In a reverse gear mechanism, the combination of a driving shaft, a driven shaft, a spur gear on the driving shaft, an internal gear extended into a hub and fixed to the driven shaft having an outer cylindrical bearing surface, a casing with an internal bearing surface to coact with the outer surface of said internal gear, and clutch means for connecting and controlling the parts, coacting as specified.

6. In a reverse gear mechanism, the combination of a driving shaft, a driven shaft, a spur gear having a shouldered journal hub on the driving shaft, an internal gear extended into a shouldered journal hub and fixed to the driven shaft having an outer cylindrical bearing surface, a casing with an internal bearing surface to coact with the outer surface of said internal gear, and with journal bearings at each end to engage the shouldered hubs of said gears to prevent relative longitudinal movement, and clutch means for connecting and controlling the parts, coacting as specified.

7. In a reverse gear mechanism, the combination of a driving shaft, a driven shaft, a spur gear having a shouldered journal hub on the driving shaft, an internal gear extended into a shouldered journal hub and fixed to the driven shaft, a casing with journal bearings at each end to engage the shouldered hubs of said gears to prevent relative longitudinal movement, and clutch means for connecting and controlling the parts, coacting as specified.

In witness whereof, I have hereunto set my hand and seal in the presence of two witnesses.

HARRY J. PERKINS. [L. S.]

Witnesses:
 LUELLA G. GREENFIELD,
 MARGARET L. GLASGOW.

Copies of this patent may be obtained for five cents each, by addressing the "Commissioner of Patents, Washington, D. C."